Feb. 2, 1965  D. P. SCOTTO  3,167,962
DOUBLY INTEGRATING ACCELEROMETER
Filed Dec. 6, 1961
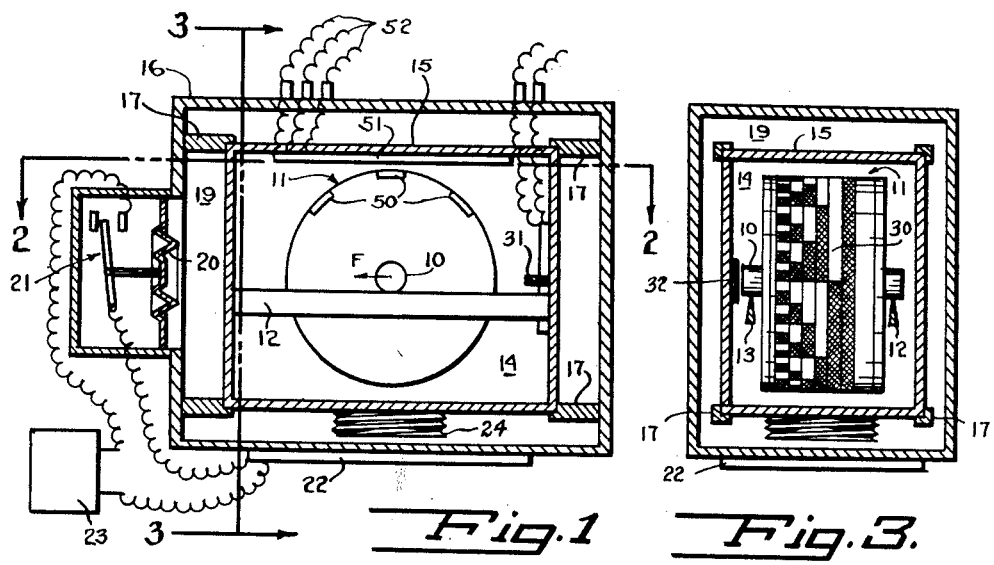
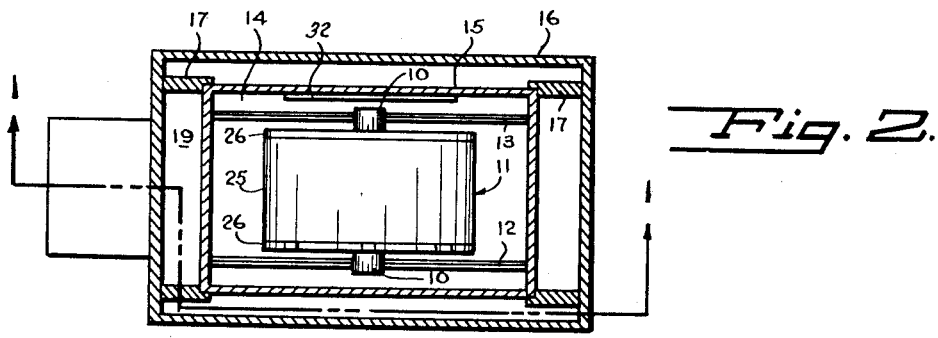
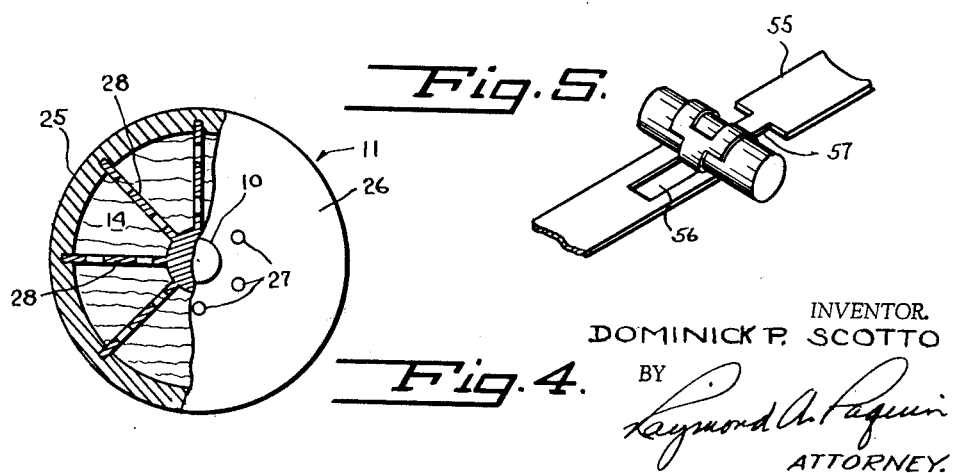
INVENTOR.
DOMINICK P. SCOTTO
BY
*Raymond A. Paquin*
ATTORNEY.

United States Patent Office 3,167,962
Patented Feb. 2, 1965

3,167,962
DOUBLY INTEGRATING ACCELEROMETER
Dominick P. Scotto, Plainview, N.Y., assignor to American Bosch Arma Corporation, a corporation of New York
Filed Dec. 6, 1961, Ser. No. 157,471
5 Claims. (Cl. 73—490)

The present invention relates to acceleration sensors and has particular reference to doubly integrating accelerometers.

Navigation systems using tables platforms often require an inertial distance reference to determine the actual motion of the vehicle. Sometimes the navigation system is designed to operate for a limited, relatively short time period as when controlling fusing circuits of ballistic projectiles for example and a simple, inexpensive distance meter is desired. The present invention is particularly suitable for this occasion.

The invention is a mechanical device which performs double integration of linear acceleration to produce an angular shaft displacement proportional to the vehicle displacement. In accordance with this invention an inertial flywheel or drum is suspended in an almost neutrally buoyant condition in a fluid. The unsupported weight is taken up by a track, on which an axle through the center of gravity of the drum rolls without sliding. The nearly buoyant drum rolls on the track in response to acceleration forces parallel to the track. It can be shown that the angular displacement of the drum is proportional to the second integral with respect to time of the linear acceleration, or to the distance travelled.

The practical instrument must attain a high accuracy and retain that accuracy over considerable changes in environmental conditions. In order to reduce temperature sensitivity, the buoyant drum is preferably a hollow, porous drum so that the drum is filled with the flotation fluid. The drum may also be fitted with interior baffles by which relative motion of the fluid within the drum and the drum itself is reduced to a minimum to reduce the energy loss to the fluid.

The angular displacement of the drum can be determined by any suitable method preferably by the use of digitally coded information deposited on the drum in some manner. However, any accurate method using optical, capacitive or electromagnetic pickoff systems can be used as desired.

Furthermore, the instrument should include a force motor means whereby gravity effects can be cancelled during standby, or which can return the rotation mass to an initial reference position.

For a more complete understanding of the invention, reference may be had to the accompanying diagrams, in which FIG. 1 is an interior view of the accelerometer in which the casing is cut along plane 1—1 of FIG. 2;

FIG. 2 is an interior view in which the casing is cut away along plane 2—2 of FIG. 1;

FIG. 3 is an interior view from the left hand end of FIG. 1, in which the casing is cut away at plane 3—3 of FIG. 1;

FIG. 4 is a view of the drum with one end partially cut away to reveal the interior; and FIG. 5 is a closeup view of the preferred tape suspension.

With reference now to FIGS. 1, 2 and 3, the axle 10 of a drum 11 rests on tracks 12, 13. In order to preclude disengagement of the axle from the tracks 12 and 13, the tracks are preferably magnetized while the axle 10 is made of magnetizable metal. This simple configuration is the basis for the present invention, which however, requires many additional features which will be described, to make the invention physically feasible. Consider first the effect of a linear acceleration which results in a force "$F$" ($=Ma$) acting at the center of gravity, i.e., at the center of axle 10. If the radius of the axle 10 is designated $r$, it will be seen that the torque tending to rotate the drum will be $Fr=Mar$. The angular acceleration of the drum 11, with respect to the tracks 12, 13 is the ratio of the torque and the moment of inertia of the drum whence $$\frac{d^2\theta}{dt^2}=\frac{M}{I}ar \quad (1)$$

and $$\theta=\iint\frac{M}{I}ardt^2=\frac{1}{2}\frac{M}{I}art^2 \quad (2)$$

Under the same acceleration but without restricting the motion of drum 11 to rolling motion, the drum would move through a distance $$d=\frac{1}{2}at^2 \quad (3)$$

Therefore, the angular displacement of the drum 11 is related to the linear distance travelled, by the relationship $$\theta=\left(\frac{Mr}{I}\right)d \quad (4)$$

If the mass is a solid homogeneous mass $$\theta=2\frac{r}{R^2}d \quad (5)$$

and if the mass is a hollow, thin cylinder $$\theta=\frac{r}{R^2}d \quad (6)$$

Since the angle $\theta$ is limited in practical construction by the length of the tracks 12, 13 the factor $Mr/I$ should be extremely small. It will be seen, therefore, that a small value for this factor requires a small mass $M$, a small axle radius $r$, and a large moment of inertia $I$.

The effective mass is made small by submerging the drum 11 in a fluid 14 of almost equal density so that the drum is almost neutrally buoyant in the fluid but has a slight tendency to sink therein. Since the axle 10 is required to support only an extremely small unbalance weight, the radius of the axle can be made very small. The moment of inertia is maximized by concentrating the mass of the drum at the outer circumference as by making the drum 11 hollow for example.

Completing the description of FIGS. 1, 2, 3, the inner fluid-tight casing or chamber 15 contains the fluid 14 in which drum 11 is submerged, and the casing 15 is supported within the outer casing or housing 16 by a framework or by studs 17. The space 18 on all sides of the inner casing 15 between the inner casing 15 and outer casing 16 is filled with a fluid 19 for maintaining the temperature of the inner casing 15 substantially constant. For this purpose the fluid chosen for fluid 19 has a high temperature coefficient of expansion. The rise of temperature of fluid 19 above a predetermined value operates the diaphragm 20 which opens switch 21 to disconnect the heating element 22 from its power supply 23. When the temperature of the fluid 19 drops below a certain value the fluid volume decreases and switch 21 is closed to re-energize the heating element 22 and to readjust the temperature of the fluid 19 in the space 18. The fluid 14, too, is susceptible to expansion and to allow for change in volume, the inner casing 15 is fitted with a bellows structure 24 which allows expansion and contraction of fluid 14.

The sensitivity of the distance meter to changes in temperature of fluid 14 is reduced by constructing the drum 11 as shown in FIG. 4. In this figure the drum 10 is shown as including a thin shell cylinder 25, closed by a disc like cover 26, which is partly broken away to reveal the interior construction, and a similar end cover (not shown) on the far end, of the cylinder 25. The covers 26 are provided with a plurality of holes 27 near the axle 10 which permit the fluid 14 to fill the drum 16 and to flow in and out of the drum as the fluid volume changes.

The interior of the drum 11 is provided with radially extending perforated baffles 28 which force the entrapped fluid 14 to rotate with the drum 10, i.e., they do not allow relative motion between the drum 10 and the fluid inside of the drum 10.

Considering the effect of temprature variations, the response of an instrument of this invention can be expressed as $$\theta = K\frac{r}{R^2}d\left[K'\left(\frac{1+C_1\Delta T}{1+C_2\Delta T}\right)-1\right] \quad (7)$$

where

K, K', $C_1$ and $C_2$ are constants,
$\Delta T$ is the change in temperature from normal operating temperature, and $\theta$, $r$, $R$ and $d$ are as defined before.

The composite drum of FIG. 4 permits latitude in the choice of the factors which determine $C_1$ and $C_2$ so that the function in brackets in Equation 7 can be made relatively insensitive to $\Delta T$ and the relationship of Equation 3 applies over a wide range of temperatures.

The rotational displacement $\theta$ of drum 11 can be determined in any desired manner. FIGS. 1, 2 and 3 show a possible method schematically. Although the practical implementation would be more complex, the pick off itself is not a part of this invention and any accurate means will be acceptable. The scheme shown in FIGS. 1, 2, 3 depends upon the readout of digital information 39 stored on the surface of the cylinder 25. The readout head 31 is adapted to read in a plane parallel to the tracks 12, 13. The reference index remains stationary even though the surface being scanned moves closer to or further away from the reader. In any other position of the reader, the reference index as well as the position of the scanned surface would be inconstant. Although the output could be corrected to take care of this effect a discussion here seems unnecessary to the understanding of the invention.

In another pickoff scheme shown best in FIGS. 2 and 3 an electro-magnetic pickoff winding 32 senses the linear position of axle 10 opposite the winding 32. Since the linear displacement of the axle 10 is proportional to the angular displacement of the drum 11 the output of the pickoff will be proportional to distance travelled.

Another important accessory for a practical instrument is a force motor which can apply a restoring or bias force to the mass, such for example, as might be required to counteract the acceleration of gravity during standby conditions. If the acceleration of gravity is permitted to act on an unbiased, vertically oriented, doubly-integrating accelerometer, the mass will be displaced continuously and may not have sufficient range remaining after flight is started. Although caging means might hold the accelerometer inactive until flight time, it is preferable to include some force motor means for biasing the mass against the acceleration of gravity since the force motor also can be used to return the meter to zero if desired as in extending the range of the accelerometer.

The particular construction of the force motor is not important to an understanding of the accelerometer operation and the embodiment shown in the figures is merely illustrative. The rim of cover 26 is provided with a plurality of equally spaced magnetic inserts 50. An electromagnetic winding 51 formed of a plurality of segments is attached to the wall of inner casing 14. Any part of the winding 51 may be energized by an external source (not shown) to attract a particular insert 50 to a given segment of the winding 51 and to thereby apply a torque to the mass 11 to rotate the mass either to the right or left as desired, or to hold it in place against the action of gravity. It should be understood that the brief description of the force motor does not give the details of an operative motor since the details are not pertinent to this invention.

FIG. 5 shows a tape support which is an alternative to the magnetized tracks 12, 13. The tape 55 includes rectangular opening 56 in which a cut down section 57 of the tape 55 fits when the tape 55 is wrapped around the shaft 10. This "Belt-Buckle" arrangement has the requisite characteristics of the track—no rolling friction, no restoring force and no slipping. The ends of the tape 55 are, of course, attached to the end walls of the inner casing 14 preferably by spring means for maintaining constant tension on the tapes 55. The single rectangular aperture 56 will limit the allowable rotation of shaft 10 to one revolution but this appears to be ample range for many instruments. Extended range for two or more revolutions could be provided by tapes in which the opening 56 is shaped to permit continued wrapping of the tape 55 around the shaft 10, if desired.

I claim:

1. In a device of the character described, a sealed chamber, a track in said sealed chamber, a mass, a shaft in said mass, said shaft being adapted to roll on said track, means for determining the angular displacement of said shaft, and a fluid in said chamber, said mass being in substantial but not exact neutral buoyancy in said fluid, said mass comprising a hollow drum having openings in a small portion of its surface, to entrap said fluid within said drum while providing fluid leakage by way of said openings.

2. In a device of the character described, a sealed chamber, a track in said sealed chamber, a mass, a shaft in said mass, said shaft being adapted to roll on said track, means for determining the angular displacement of said shaft, a fluid in said chamber, said mass being in substantial but not exact neutral buoyancy in said fluid, said mass comprising a hollow drum filled with said fluid and having openings in a small portion of its surface for entrapping said fluid within said drum while providing fluid leakage by way of said openings, and baffle means within said drum to cause the fluid within the drum to rotate with said drum.

3. In a device of the character described, a frame, a track in said frame, a mass, a shaft in said mass, said shaft being adapted to roll on said track and means for determining the angular displacement of said shaft, said track comprising a tensioned, flexible tape having opposite ends extending in different directions normal to said shaft, said tape intermediate said ends being wound around said shaft.

4. In a device of the character described, a sealed chamber, a track in said sealed chamber, a mass, a shaft in said mass, said shaft being adapted to roll on said track, means for determining the angular displacement of said shaft, and a fluid in said chamber, said mass being in substantial but not exact neutral buoyancy in said fluid, said track comprising a tensioned, flexible tape having opposite ends extending in different directions normal to said shaft, said tape intermediate said ends being wound at least once around said shaft.

5. In a device of the character described, a sealed chamber, a track in said sealed chamber, a mass, a shaft in said mass, said shaft being adapted to roll on said track, means for determining the angular displacement of said shaft, and a fluid in said chamber, said mass being in substantial but not exact neutral buoyancy in said fluid, said mass comprising a hollow drum filled with said fluid and having a plurality of openings in a small fraction of its surface thereby to entrap said fluid in said drum and to permit said fluid to leak into and out of said drum, said track comprising a tensioned, flexible tape extending normally to said shaft, said tape having an axially-oriented rectangular aperture therein and having axially spaced from said aperture a region of reduced width aligned with said aperture and of smaller width than said rectangular aperture, the portion of said tape containing said aperture and reduced-width region being wrapped about said shaft with said reduced-width region extending through said aperture.

References Cited in the file of this patent

UNITED STATES PATENTS

| | | |
|---|---|---|
| 2,033,127 | Dunlea | Mar. 10, 1936 |
| 2,853,287 | Draper | Sept. 23, 1958 |
| 2,857,149 | Bourns | Oct. 21, 1958 |
| 2,974,531 | Ackerman | Mar. 14, 1961 |
| 3,020,367 | Bariffi | Feb. 6, 1962 |

FOREIGN PATENTS

| | | |
|---|---|---|
| 340,841 | Germany | Sept. 19, 1921 |